US010168790B2

United States Patent
Deng et al.

(10) Patent No.: US 10,168,790 B2
(45) Date of Patent: Jan. 1, 2019

(54) METHOD AND DEVICE FOR ENABLING VIRTUAL REALITY INTERACTION WITH GESTURE CONTROL

(71) Applicant: ARCSOFT (HANGZHOU) MULTIMEDIA TECHNOLOGY CO., LTD., Hangzhou (CN)

(72) Inventors: Hui Deng, Hangzhou (CN); Chongyang Lin, Hangzhou (CN)

(73) Assignee: ARCSOFT (HANGZHOU) MULTIMEDIA TECHNOLOGY CO., LTD., Hangzhou (CN)

(*) Notice: Subject to any disclaimer, the term of this patent is extended or adjusted under 35 U.S.C. 154(b) by 0 days.

(21) Appl. No.: 15/616,945

(22) Filed: Jun. 8, 2017

(65) Prior Publication Data

US 2018/0188815 A1    Jul. 5, 2018

(30) Foreign Application Priority Data

Jan. 4, 2017   (CN) .......................... 2017 1 0004798

(51) Int. Cl.

| | |
|---|---|
| *G06F 3/01* | (2006.01) |
| *G06K 9/00* | (2006.01) |
| *G06T 3/40* | (2006.01) |
| *G06T 5/00* | (2006.01) |
| *H04N 9/12* | (2006.01) |
| *H04N 9/73* | (2006.01) |
| *G06F 3/033* | (2013.01) |

(52) U.S. Cl.
CPC .............. *G06F 3/017* (2013.01); *G06F 3/033* (2013.01); *G06K 9/00355* (2013.01); *G06T 3/40* (2013.01); *G06T 5/002* (2013.01); *G06T 2207/10024* (2013.01); *G06T 2207/20212* (2013.01); *H04N 9/12* (2013.01); *H04N 9/73* (2013.01)

(58) Field of Classification Search
CPC ..... G06F 3/017; G06F 3/033; G06K 9/00355; H04N 5/44504
See application file for complete search history.

(56) References Cited

U.S. PATENT DOCUMENTS

| | | | | |
|---|---|---|---|---|
| 8,666,115 | B2 * | 3/2014 | Perski ..................... | G06F 3/017 382/103 |
| 2002/0024675 | A1 * | 2/2002 | Foxlin ................... | G02B 27/017 356/620 |
| 2011/0007035 | A1 * | 1/2011 | Shai ........................ | G06F 3/014 345/179 |
| 2012/0249741 | A1 * | 10/2012 | Maciocci ................ | G06F 3/011 348/46 |
| 2013/0021371 | A1 * | 1/2013 | Ueno ........................ | G06T 1/20 345/629 |
| 2015/0062165 | A1 * | 3/2015 | Saito ..................... | G02B 27/017 345/633 |

* cited by examiner

*Primary Examiner* — Ariel A Balaoing
(74) *Attorney, Agent, or Firm* — Perkins Coie LLP

(57) ABSTRACT

The present invention is a method for enabling virtual reality interaction with gesture control, comprising the following steps: displaying a photographed second image in response to a gesture detecting signal; recognizing an actual gesture action in the second image and converting the same into a graphic pointer; and displaying a first image and displaying the graphic pointer at a position corresponding to the first image for interaction. A user may conduct control directly with a gesture to enable virtual reality, thereby solving the problem where the user cannot see an actual scenario as well as increasing the ease of use for virtual reality.

12 Claims, 5 Drawing Sheets

METHOD AND DEVICE FOR ENABLING VIRTUAL REALITY INTERACTION WITH GESTURE CONTROL

CROSS-REFERENCE TO RELATED APPLICATIONS

This Non-provisional application claims priority under 35 U.S.C. § 119(a) on Patent Application No(s). 201710004798.0 filed in People's Republic of China on Jan. 4, 2017, the entire contents of which are hereby incorporated by reference.

BACKGROUND OF THE INVENTION

Field of the Invention

The present invention relates to the technical field of virtual reality, and in particular to a method and device for enabling virtual reality interaction with gesture control.

Description of the Related Art

In 2016, the virtual reality industry (i.e. the so-called VR industry) remained a focus around the world, and virtual reality devicees, i.e. VR devices, from all the leading manufacturers came into the market one after another. Most of the VR devices for information interaction incorporate a control handle or a touch pad on the whole and thus are high in price, common users generally can only accept low-price VR devices due to a price limit, and the low-price VR devices may be only used for displaying an image on a mobile terminal and cannot enable information interaction for the users.

In this case, Hand Gesture for Mobile VR, i.e. a gesture for a virtual reality device turns up as the times require. However, when answering a call or checking a short message while watching a VR image, a user cannot acknowledge the surrounding environment, move a hand into a region detectable for a camera, and execute an action with the hand accurately due to the wearing of a helmet, in case of not adding any hardware to the current Hand Gesture for Mobile VR.

BRIEF SUMMARY OF THE INVENTION

To solve the technical problem that a user cannot acknowledge the surrounding environment and accurately move the hand to a region detectable for a camera due to the wearing of a helmet during information interaction, the present invention provides a method for enabling virtual reality interaction with gesture control.

A method for enabling virtual reality interaction with gesture control comprises the following steps:

displaying a photographed second image in response to a gesture detecting signal;

recognizing an actual gesture action in the second image and converting the actual gesture action into a graphic pointer; and displaying a first image and displaying the graphic pointer at a position corresponding to the first image for interaction.

As an implementable means, recognizing the actual gesture action in the second image and converting the actual gesture action into the graphic pointer may comprise the following steps:

capturing moving block masses appearing in the second image, analyzing the moving block masses to obtain several block masses approximate to a hand, and selecting all the block masses approximate to the hand as candidate hand regions;

determining a hand shape in each candidate hand region, and if a plurality of the candidate hand regions pass verification, selecting a sum of the candidate hand regions passing the verification as a particular region; and converting the actual gesture action in the particular region into a graphic pointer.

As an implementable means, the first image may be presented before a gesture detecting signal is detected; and the displayed photographed second image may contain the first image.

As an implementable means, that the displayed photographed second image contains the first image may refer that the first image and the second image are superimposed with an Alpha Blending algorithm.

As an implementable means, the second image may be preprocessed as the second image is photographed.

As an implementable means, the second image may be preprocessed after the second image is photographed.

As an implementable means, the preprocessing performed on the second image may comprise at least one of zooming, white balance adjusting, exposure adjusting and image denoising.

An device for enabling virtual reality interaction with gesture control comprises a second image displaying module, a pointer recognizing module and an interaction displaying module;

the second image displaying module is used for displaying a photographed second image in response to a gesture detecting signal;

the pointer recognizing module is used for recognizing an actual gesture action in the second image and converting the actual gesture action into a graphic pointer; and the interaction displaying module is used for displaying a first image and displaying the graphic pointer at a position corresponding to the first image for interaction.

As an implementable means, the pointer recognizing module may comprise a capturing and analyzing module, a hand shape detecting module and a graphic pointer converting module;

the capturing and analyzing module is used for capturing moving block masses appearing in the second image, analyzing the moving block masses to obtain a plurality of block masses approximate to a hand and selecting all the block masses approximate to the hand as candidate hand regions;

the hand shape detecting module is used for determining a hand shape in each candidate hand region, and if the plurality of candidate hand regions pass verification, selecting a sum of the candidate hand regions passing the verification as a particular region; and the graphic pointer converting module is used for converting the actual gesture action in the particular region into the graphic pointer.

As an implementable means, the interaction displaying module may be configured so that the first image is presented before the gesture detecting signal is detected.

As an implementable means, the second image photographed through interaction display may contain the first image.

As an implementable means, the interaction displaying module may be configured so that the displayed photographed second image contains the first image refers that the first image and the second image are superimposed with an Alpha Blending algorithm.

As an implementable means, the interaction displaying module may be configured so that the second image is preprocessed as the second image is photographed.

As an implementable means, the interaction displaying module may be configured so that the preprocessing performed on the second image comprises at least one of zooming, white balance adjusting, exposure adjusting and image de-noising.

Compared with the prior art, the present invention has the following advantageous effects:

the method for enabling virtual reality interaction with gesture control of the present invention comprises the following steps: displaying a photographed second image in response to a gesture detecting signal; recognizing an actual gesture action in the second image and converting the same into a graphic pointer; and displaying a first image and displaying the graphic pointer at a position corresponding to the first image for interaction. A user can conduct control directly with a gesture to enable virtual reality, thereby solving the problem where the user cannot see an actual scenario as well as increasing the ease of use for the virtual reality.

DETAILED DESCRIPTION OF THE INVENTION

The above and additional technical features and advantages of the present invention will be described clearly and completely below in combination with accompanying drawings, and it is obvious that the embodiments described below are merely part of rather than all of the embodiments of the present invention.

Regarding an overview of application scenarios, the present invention is enabled depending on a virtual reality device; when a user uses the virtual reality device (the VR device), there is a gesture detecting signal accessed suddenly; at the moment, the second image photographed is displayed, and an actual gesture in the second image is converted into a graphic pointer; and at the moment, a first image is displayed, moreover, the graphic pointer is displayed at a position corresponding to the first image, and the virtual reality interaction is controlled with a gesture action.

Optionally, the first image appears when the second image is displayed or after the second image disappears.

That is, the steps to be described next in the methods of the embodiments of the present invention may completely depend on the virtual reality device or an device similar to the virtual reality device for execution.

Figure 1:
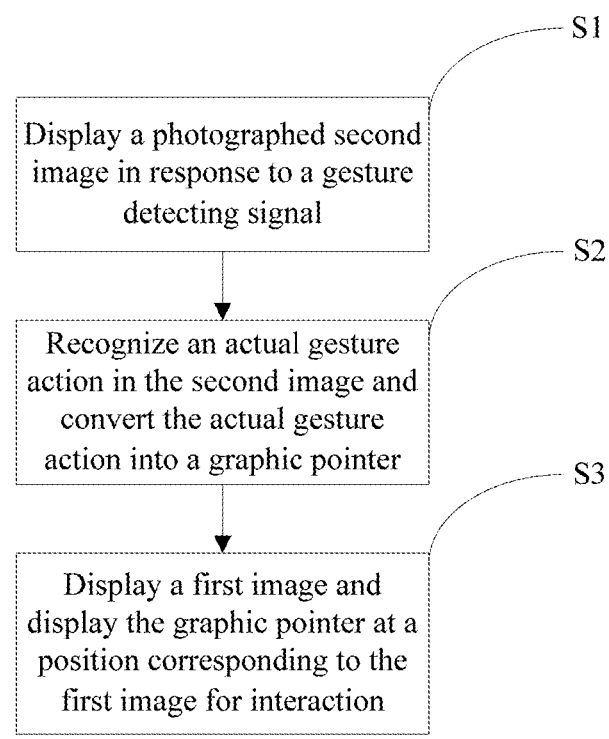
FIG. 1 is a schematic diagram of a flow process of a method for enabling virtual reality interaction with gesture control of an embodiment of the present invention.

An exemplary method is as follows:

as is shown with reference to FIG. 1, a method for enabling virtual reality interaction with gesture control comprises the following steps:

Step S1, displaying a photographed second image in response to a gesture detecting signal;

Step S2, recognizing an actual gesture action in the second image and converting the same into a graphic pointer; and Step S3, displaying a first image and displaying the graphic pointer at a position corresponding to the first image for interaction.

Further, recognizing an actual gesture action in the second image and converting the same into a graphic pointer comprises a specific process as follows:

S201, capturing moving block masses appearing in the second image, analyzing the moving block masses to obtain several block masses approximate to a hand, and selecting all the block masses approximate to the hand as candidate hand regions;

S202, determining a hand shape in each candidate hand region, and if a plurality of the candidate hand regions pass verification, selecting a sum of the candidate hand regions passing the verification as a particular region; and S203, converting the actual gesture action in the particular region into a graphic pointer.

With the process for converting the actual gesture action into the graphic pointer using the method for enabling virtual reality interaction with gesture control and the actual gesture action specifically recognized in the second image, a user may conduct control directly with a gesture to enable virtual reality, thereby solving the problem where the user cannot see an actual scenario as well as increasing the ease of use for the virtual reality.

Optionally, the first image may be displayed before the gesture detecting signal is detected, the photographed second image is displayed when the gesture detecting signal is detected, and at the moment, the photographed second image that is displayed contains the first image.

Embodiment 1

A method for enabling virtual reality interaction with gesture control is illustrated in detail with reference to FIG. 3 to FIG. 6 as schematic diagrams of scenarios.

Figure 3:
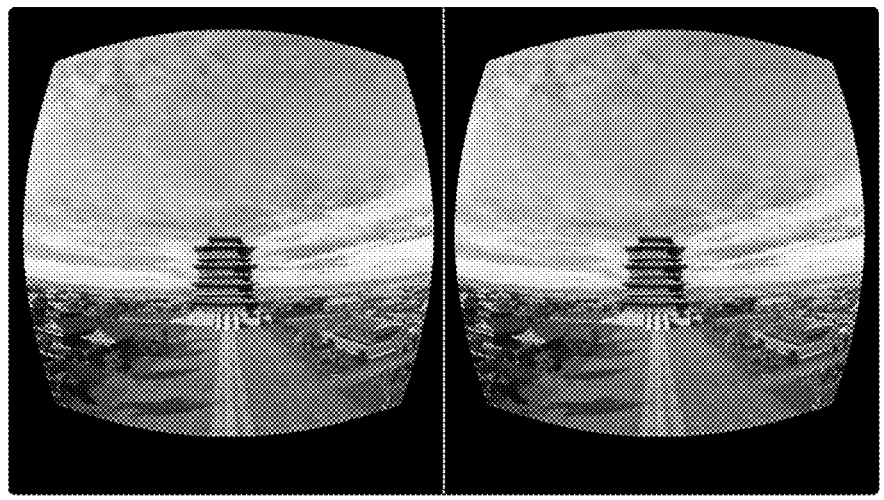
FIG. 3 to FIG. 6 are schematic diagrams of specific application scenarios of embodiments of the present invention.
Figure 4:
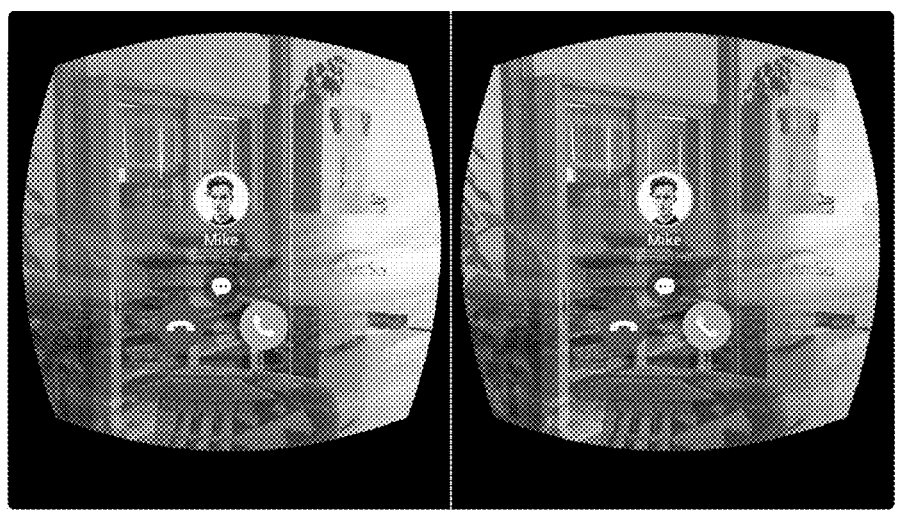
Figure 5:
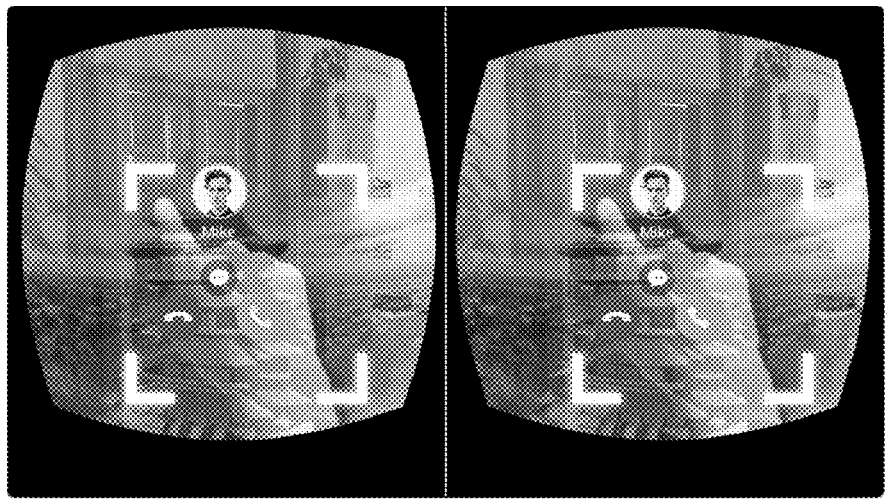
Figure 6:
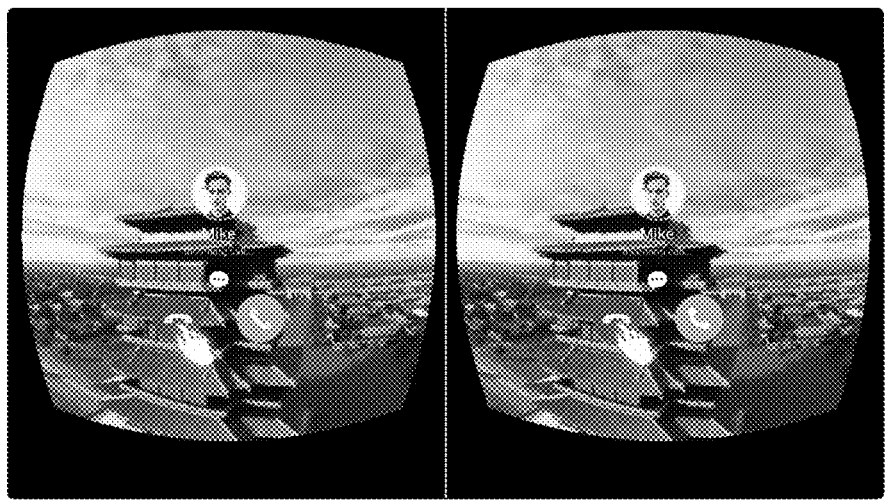
Figure 7:
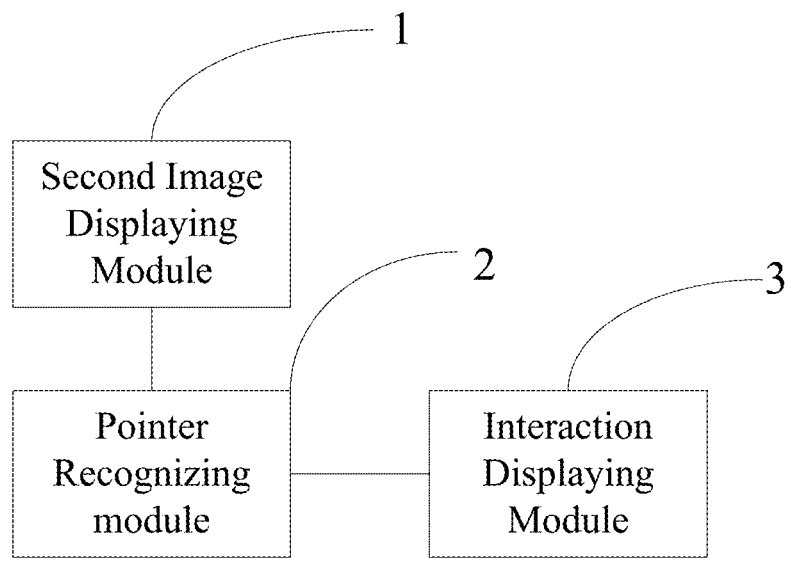
FIG. 7 is a schematic diagram of an device for enabling virtual reality interaction with gesture control of the present invention.

In the present embodiment, as shown in FIG. 3, a user watches the first image; as shown in FIG. 4, the user has a call accessed, that is, once a gesture signal is detected, the photographed second image starts to be displayed, however, the second image displayed at the moment is subjected to processing and contains the first image therein; as shown in FIG. 5, an actual gesture action appears in the second image and is converted into a graphic pointer; and as shown in FIG. 6, the second image disappears, the first image is displayed, the graphic pointer appears at a position corresponding to the first image to track the actual gesture action, and the user controls the position of a virtual pointer by moving the hand so as to control the action execution of the pointer with a gesture action.

Figure 2:
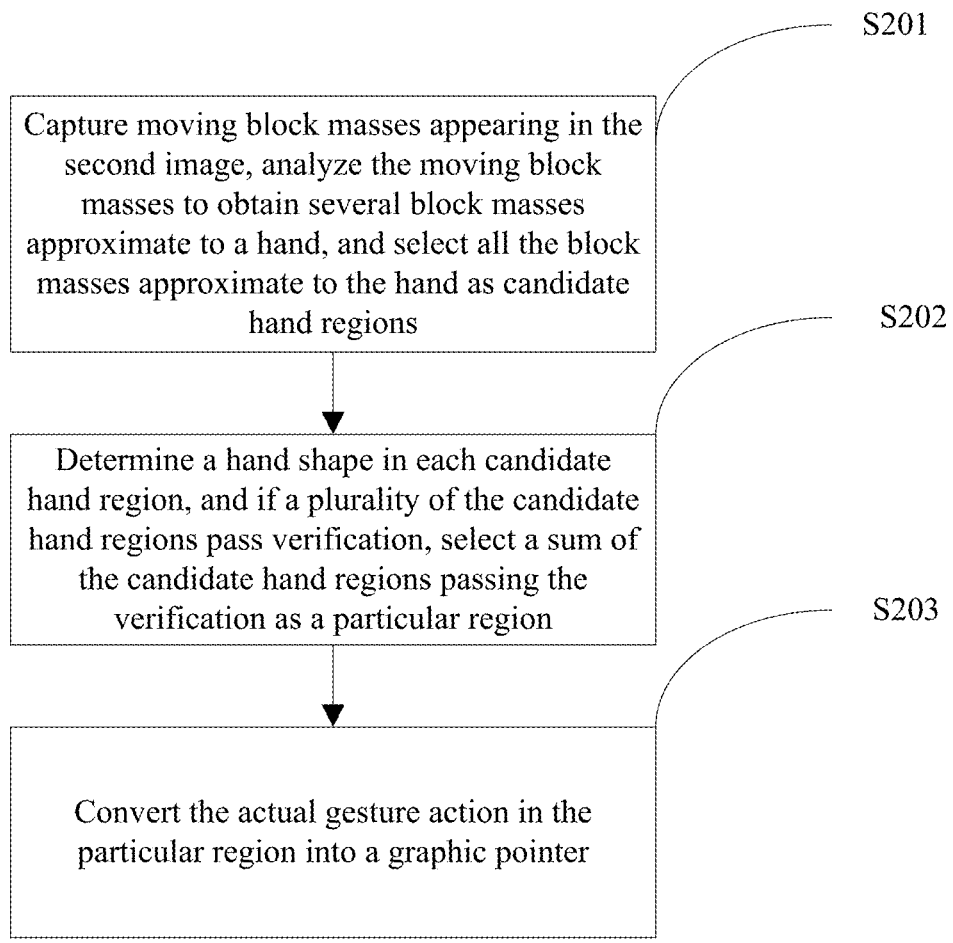
FIG. 2 is a schematic diagram of a flow process of recognizing an actual gesture action in a second image and converting the same into a graphic pointer of the present invention.

In FIG. 5, the actual gesture action appears, in FIG. 6, the graphic pointer appears, and with reference to FIG. 2, a specific method for converting the actual gesture action into the graphic pointer comprises the following steps:

S201, capturing moving block masses appearing in the second image, analyzing the moving block masses to obtain several block masses approximate to a hand, and selecting all the block masses approximate to the hand as candidate hand regions;

S202, determining a hand shape in each candidate hand region, and if a plurality of the candidate hand regions pass verification, selecting a sum of the candidate hand regions passing the verification as a particular region; and S203, converting the actual gesture action in the particular region into a graphic pointer.

Step S201 has a specific process as follows: some moving block masses are obtained with skin color and motion detection methods, some moving blocks that cannot be hands are filtered according to information such as color and shape of the moving block masses; the moving block masses remained after filtering that are possibly hands are subjected to movement predicting and tracking and are analyzed in terms of moving speed, trace and other information thereof to obtain some moving block masses that are most possibly hands, and regions in which these moving block masses appear are taken as candidate regions to be detected in a next step;

Step S202 has a specific process as follows: in each candidate region, a plurality positions and a plurality of dimensions are subjected to the extraction of texture features and gradient features, the extracted texture features are sent into a classifier well trained off-line for judging a hand shape, and if a plurality of positions pass verification, non-maximal suppression needs to be performed on these candidate regions to finally output a rectangular frame containing the actual gesture action; and the actual gesture action is finally converted into a graphic pointer in the rectangular frame.

After the actual gesture action is converted into the pointer, the hand needs to be tracked and a hand action needs to be recognized to further control the position of the virtual pointer by moving the hand and to control the action execution of the pointer with the gesture action.

The tracking of the hand includes movement prediction, tracking, online learning and online verification, where the movement prediction is to predict the position of a current frame target according to a previous movement status of the target; a tracking algorithm may be one such as particle filtering, optical flow tracking and compression tracking; an online learning module extracts the feature of a tracking target in real time for learning, and updates the online classifier in real time; and the online verification is to verify the current tracking target with the online classifier, and the target is abandoned if the target is not a hand, thereby excluding possible tracking errors.

Before the hand is tracked, a predefined dynamic gesture is configured, the gesture action is recognized while the movement and change of the hand are detected, and compared with the predefined dynamic gesture action, the pointer is controlled if the gesture action is the same as the predefined dynamic gesture.

A particular action of the hand is also sensed while the hand is tracked, for example, the gesture action also needs to be made for recognition, comparison with the predefined dynamic gesture and recognition of the hand shape of the user, therefore, the user may finish some clicking actions with particular actions; while the hand is tracked, the gesture also needs to be recognized for recognizing a gesture type, and to determine whether the gesture changes and whether the gesture changes from one static gesture to another static gesture, for example from a palm into a fist, these gestures need to be recognized with a recognition method as follows: multi-classification recognition performed with a depth neutral network well-trained off-line.

In this embodiment, the second image needs to be pre-processed during photographing, the preprocessing performed on the second image comprises zooming, white balance adjusting, exposure adjusting, de-noising and the like; and after the preprocessing, the second image and the first image are subjected to Alpha Blending (Alpha Blending for Transparency), and the second image is displayed after the first and second images are processed, with the first image contained in the displayed second image.

If the second image is the one photographed with a depth camera, the second image and the first image need to be subjected to alignment processing and then Alpha Blending (Alpha Blending for Transparency), and the second image is displayed after the first and second images are processed, with the first image contained in the displayed second image.

In one embodiment, when the user watches the first image in the VR device, a gesture detecting signal can be taken as being triggered if the user wants to play with short message or with a phone, and the method for enabling the virtual reality interaction with gesture control can be used in these situations for interaction.

Exemplary Device

After the method of the exemplary embodiment of the present invention is introduced, an device for enabling virtual reality interaction with gesture control of an exemplary embodiment of the present invention is introduced next with reference to the drawings.

The implementation of the device for enabling the virtual reality interaction with gesture control may be made with reference to the implementation of the method as described above, and thus no more repetition will be made here. Terms such as "unit" or "module" used below may be a combination of software and/or hardware with a specified function. Although the device as described by the embodiment below is preferably implemented with software, it is also possible to assume the implementation with hardware or the combination of software and hardware.

Figure 8:
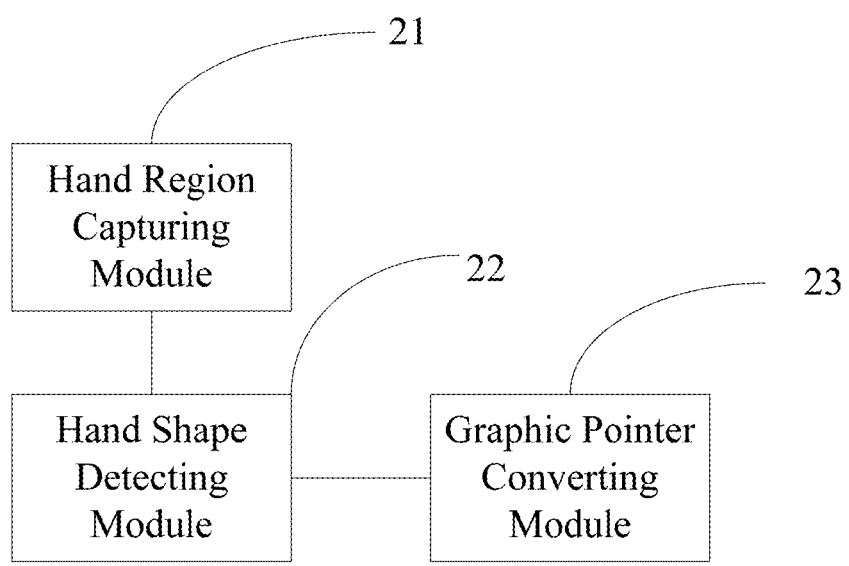
FIG. 8 is a schematic diagram of a pointer recognizing module of the present invention.

As shown in FIG. 8, an device for enabling virtual reality interaction with gesture control comprises a second image displaying module 1, a pointer recognizing module 2 and an interaction displaying module 3;

the second image displaying module 1 is used for displaying a photographed second image in response to a gesture detecting signal;

the pointer recognizing module 2 is used for recognizing an actual gesture action in the second image and converting the same into a graphic pointer; and the interaction displaying module 3 is used for displaying a first image and displaying the graphic pointer at a position corresponding to the first image for interaction.

As shown in FIG. 8, the pointer recognizing module 2 comprises a capturing and analyzing module 21, a hand shape detecting module 22 and a graphic pointer converting module 23;

the capturing and analyzing module 21 is used for capturing moving block masses appearing in the second image, analyzing the moving block masses to obtain several block masses approximate to a hand and selecting all the block masses approximate to the hand as candidate hand regions;

the hand shape detecting module 22 is used for determining a hand shape in each candidate hand region, and if the plurality of candidate hand regions pass verification, selecting a sum of the candidate hand regions passing the verification as a particular region; and the graphic pointer converting module 23 is used for converting the actual gesture action in the particular region into the graphic pointer.

Further, the interaction displaying module 3 is configured so that the photographed second image displayed contains the first image.

Further, the interaction displaying module 3 is configured so that 'the photographed second image displayed contains the first image' refers that the first image and the second image are superimposed with an Alpha Blending algorithm.

Further, the interaction displaying module 3 is configured so that the second image is preprocessed as the second image is photographed.

Further, the interaction displaying module 3 is configured so that the preprocessing performed on the second image comprises at least one of zooming, white balance adjusting, exposure adjusting and image de-noising.

It should be noted that the capturing and analyzing module 21 comprises a hand region capturing module and an analyzing module; the hand region capturing module is used for taking the second image and capturing a hand region in the second image, more specifically, the hand region capturing module is a camera for the VR device; the camera is either placed inside the VR device or installed outside the VR device, and the camera includes a color camera, a depth camera, an rgb-d camera, an infrared camera and the like, and since how to process the photographed second image in case of the depth camera is described in the method, no more repetition is made here.

It should be noted that although several modules of the device for enabling virtual reality interaction with gesture control are mentioned in the detailed description above, this division is only illustrative but not compulsory. In fact, the features and functions of three and more modules as described above can be embodied in one module according to the embodiment of the present invention. On the contrary, the features and functions of one module as described above can be further divided into a plurality of modules for embodification.

In addition, although the operation of the method of the present invention is described in a particular sequence in the drawings, it is not intended to require or imply that these operations must be executed according to the particular sequence, or an expected result can be achieved only after all the operations as shown are executed. Additionally or alternatively, some steps therein can be omitted, a plurality of steps can be combined into one step to be executed, and/or one step can be broken down into a plurality of steps to be executed.

The object, technical solution, and advantageous effects of the present invention are further illustrated in details with the specific embodiments as described above, and it should be understood that the description above only involves the specific embodiments of the present invention and is not intended to limit the protection scope of the present invention. It is particularly indicated that for those skilled in the art, any modifications, equivalent substitutions, improvements and the like made within the spirit and principle of the present invention are construed to be incorporated within the protection scope of the present invention.

What is claimed is:

1. A method for enabling virtual reality interaction with gesture control, comprising the following steps:
    displaying a photographed second image in response to a gesture detecting signal;
    recognizing an actual gesture action in the second image and converting the actual gesture action into a graphic pointer; and
    displaying a first image and displaying the graphic pointer at a position corresponding to the first image for interactions;
    wherein recognizing the actual gesture action in the second image and converting the actual gesture action into the graphic pointer comprises the following steps
        capturing moving block masses appearing in the second image, analyzing the moving block masses to obtain a plurality of block masses approximate to a hand, and selecting all the block masses approximate to the hand as candidate hand regions;
        determining a hand shape in each candidate hand region, and if a plurality of the candidate hand regions pass verification, selecting a sum of the candidate hand regions passing the verification as a particular region; and
        converting the actual gesture action in the particular region into a graphic pointer.

2. The method for enabling virtual reality interaction with gesture control according to claim 1, wherein the first image is presented before the gesture detecting signal is detected.

3. The method for enabling virtual reality interaction with gesture control according to claim 2, wherein the displayed photographed second image contains the first image.

4. The method for enabling virtual reality interaction with gesture control according to claim 3, wherein that the displayed photographed second image contains the first image refers that the first image and the second image are superimposed with an Alpha Blending algorithm.

5. The method for enabling virtual reality interaction with gesture control according to claim 4, wherein the second image is preprocessed as the second image is photographed.

6. The method for enabling virtual reality interaction with gesture control according to claim 5, wherein the preprocessing performed on the second image comprises at least one of zooming, white balance adjusting, exposure adjusting, and image de-noising.

7. A device for enabling virtual reality interaction with gesture control, comprising a second image displaying module, a pointer recognizing module, and an interaction displaying module;
    wherein the second image displaying module is used for displaying a photographed second image in response to a gesture detecting signal;
    the pointer recognizing module is used for recognizing an actual gesture action in the second image and converting the actual gesture action into a graphic pointer; and
    the interaction displaying module is used for displaying a first image and displaying the graphic pointer at a position corresponding to the first image for interaction;
    wherein recognizing the actual gesture action in the second image and converting the actual gesture action into the graphic pointer comprises the following steps:
        capturing moving block masses appearing in the second image, analyzing the moving block masses to obtain a plurality of block masses approximate to a hand, and selecting all the block masses approximate to the hand as candidate hand regions;
        determining a hand shape in each candidate hand region, and if a plurality of the candidate hand regions pass verification, selecting a sum of the candidate hand regions passing the verification as a particular region; and converting the actual gesture action in the particular region into a graphic pointer.

8. The device for enabling virtual reality interaction with gesture control according to claim 7, wherein the interaction displaying module is configured so that the first image is presented before the gesture detecting signal is detected.

9. The device for enabling virtual reality interaction with gesture control according to claim 8, wherein the interaction displaying module is configured so that the displayed photographed second image contains the first image.

10. The device for enabling virtual reality interaction with gesture control according to claim 9, wherein the interaction displaying module is configured so that the displayed photographed second image contains the first image refers that the first image and the second image are superimposed with an Alpha Blending algorithm.

11. The device for enabling virtual reality interaction with gesture control according to claim 10, wherein the interaction displaying module is configured so that the second image is preprocessed as the second image is photographed.

12. The device for enabling virtual reality interaction with gesture control according to claim 11, wherein the interaction displaying module is configured so that the preprocessing performed on the second image comprises at least one of zooming, white balance adjusting, exposure adjusting, and image de-noising.

* * * * *